Figure 2:
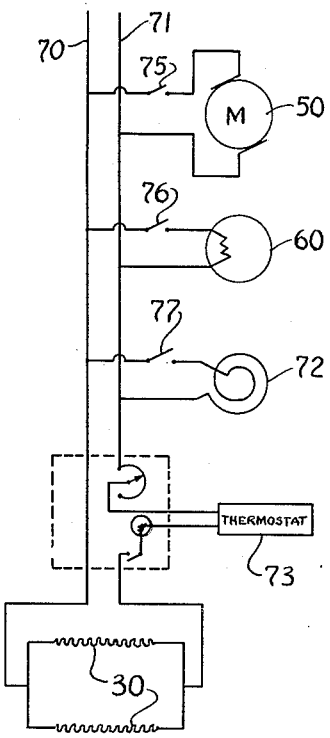

Nov. 8, 1955   R. G. WILSON   2,722,882
BARBECUE MACHINE

Filed May 3, 1955   2 Sheets-Sheet 1

INVENTOR.
R. G. WILSON
ATTORNEY

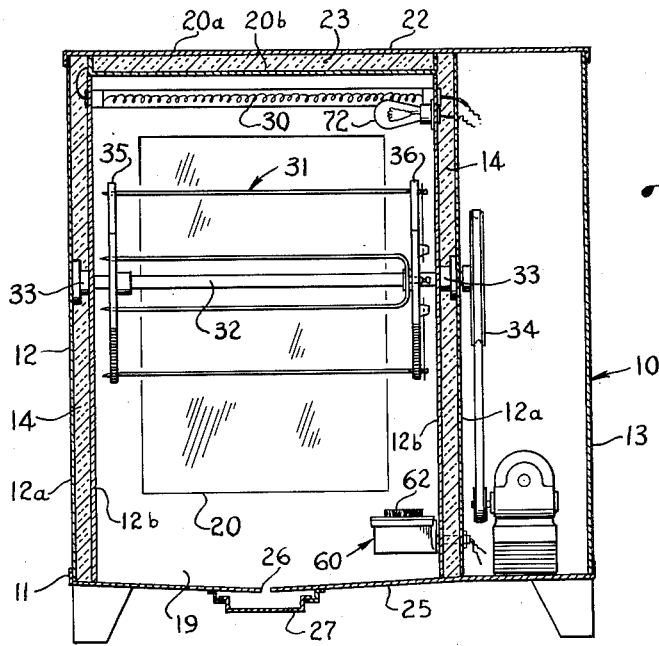

United States Patent Office 2,722,882
Patented Nov. 8, 1955

2,722,882

BARBECUE MACHINE

Robert G. Wilson, Greenville, S. C.

Application May 3, 1955, Serial No. 505,613

6 Claims. (Cl. 99—421)

This invention relates to cooking apparatus and more particularly to an improved electric barbecue machine and improved meat holding means and flavoring means.

While electric barbecue machines are generally well known there has always been a problem of constructing the oven in such a way as to conserve fuel and provide visibility and ready access to the oven for removing the meat and for cleaning the oven. Such devices have heretofore been very complicated from a mechanical standpoint and have been capable of accommodating relatively small amounts of meat. Devices for holding the meat have been awkward in that either there was a tendency for the meat to turn as the spits revolved or the spits would accommodate only meat of a particular size and shape. Attempts to provide flavoring means have met with only limited success because of the awkward positioning of the various parts of the machine.

Accordingly it is an object of this invention to provide a novel barbecue machine which will facilitate performance of the barbecuing operation efficiently, expeditiously and automatically and which is designed to facilitate cleaning of the interior of the machine.

Another object of this invention is the provision of a motor-driven barbecue machine in which the meat is continuously rotated in such a manner that it will be slowly self-basted in its own natural juices, thereby materially reducing shrinkage of the meat.

Another object of this invention resides in the particular construction of means for supporting and rotating the meat while in the oven, so arranged that the supporting means may be easily and conveniently withdrawn from the oven for the purpose of placing the meat thereon or removing the meat therefrom.

Another object of this invention is the provision of a spit and a spit-supporting arrangement whereby meats of many types, sizes, and in greater quantity may be easily accommodated in the apparatus.

It is another object of this invention to provide a barbecue machine having a substantially airtight, insulated, electrically heated oven so that there will be a minimum of heat loss thus making it possible to conserve fuel and eliminate the smoke and fumes normally resulting from a barbecueing operation and make it possible to introduce wood smoke into the oven as a means for flavoring the meat.

Still another object of this invention is to provide a barbecue machine having an oven in which the meat holding means is located below the heating means so that drippings from the meat will not fall thereon.

Yet another object of this invention is the provision of a barbecue machine having a substantially airtight oven having means both on the front and rear thereof for gaining access thereto and for observing the meat during the cooking thereof and in which means are provided for collecting drippings from the meat in the bottom of the oven.

I accomplish these and other objects of my invention by providing a substantially airtight oven, electrical heating means positioned adjacent the top of the oven, means for holding pieces of meat positioned below and suitably spaced from said heating means and an electrical heating element positioned adjacent the bottom of the oven, said heating element being adapted to produce smoke from wood chips and the like for flavoring the meat. Also provided is a sheet metal container having a plurality of apertures therein and in which said heating element includes a vertical rod-like element adapted to be received by one of the apertures and to contact the wood chips for producing smoke for flavoring the meat. There is further provided a rotary meat-supporting assembly for continuously transporting a plurality of pieces of meat in circular paths about a horizontal transverse axis within the oven with a selected portion of each piece continuously facing inwardly toward said axis.

Figure 1:
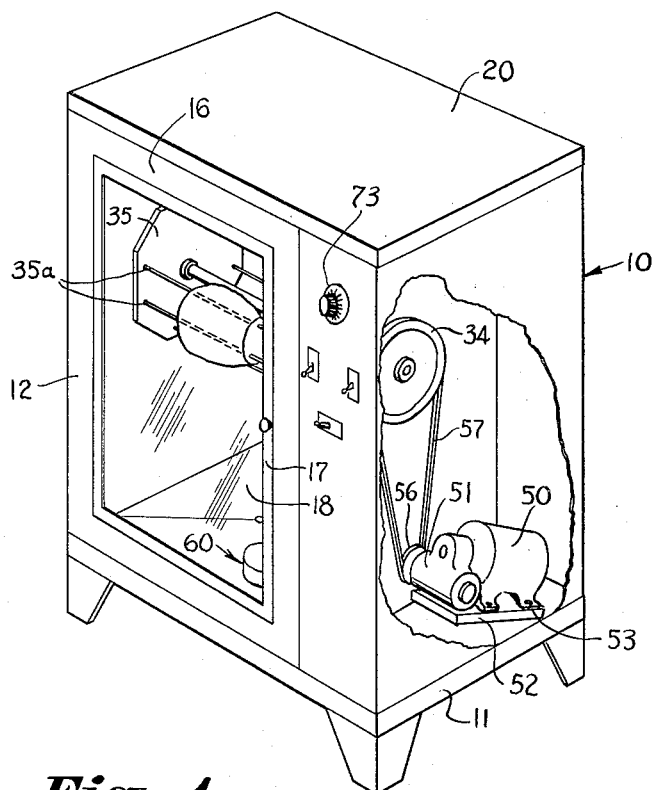
Figure 4:
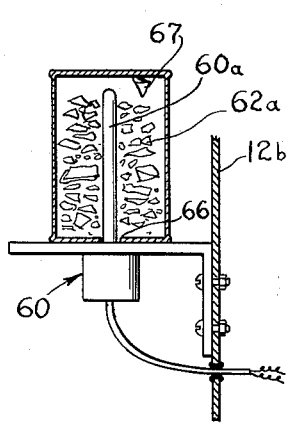
Figure 3:
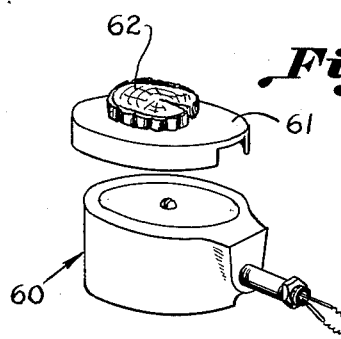

While some of the objects have been pointed out above others will become apparent to those skilled in the art relating to cooking utensils when the specification is read in connection with the attached drawings in which:

Fig. 1 is a perspective view, with parts broken away for purposes of illustrations, showing a barbecue machine constructed according to the present invention, Fig. 2 is a wiring diagram showing the various electrical connections for operating the various parts of the machine, Fig. 3 is an exploded perspective view showing the hickory smoke producing element of the machine, Fig. 4 is a sectional view showing a modified form of hickory smoke producing elements, Fig. 5 is a longitudinal vertical sectional view showing the spit construction and means for rotating the spits, Fig. 6 is an enlarged perspective view of the spit construction shown in Fig. 5, Fig. 7 is a perspective view showing a modified form of spit construction, and Fig. 8 is a perspective view showing another modified form of spit construction.

Referring now more particularly to the drawings a barbecue machine is broadly designated by the reference character 10 which includes a suitable base member 11 supporting an oven housing 12 and a driving mechanism housing 13. The oven housing 12 is in the form of a vertical rectangular closed housing, the walls and top of which, as illustrated in Fig. 5, are preferably provided with panels of thermal insulating material such as fiber glass or the like, as indicated at 14, faced by panels 12a and 12b of metallic sheet material. The front wall 16 of the oven housing 12 is preferably provided with a hinged door 17 extending over a substantial portion of the front wall 16, the door being preferably provided with a panel 18 of transparent material through which the components disposed within the housing 12 may be viewed. A similar door 19 is provided in the rear wall 20 of the oven housing 12.

The top wall of the oven housing 12, indicated by the reference character 22, is also preferably provided with suitable thermal insulating material 23 and faced by suitable sheet metal material in the form of panels 22a and 22b. The front and rear walls 16 and 20 respectively are also preferably insulated. It will be noted that the bottom of the oven defined by the oven housing 12 is provided with a dish-like sheet metal portion 25 provided with an aperture 26 in the medial portion thereof thus providing means for collecting drippings in a tray 27 provided therefor.

Electrical heating means are provided in the form of elongated resistance heating elements 30 which are positioned adjacent the top and preferably in the medial portion of the oven housing 12 and suitably secured to the walls 12b adjacent their ends. It has been found that a single tubular heating element of an improved type which is now available will produce desirable heat energy but it is to be understood that any suitable type electrical heating elements may be employed. It is also desirable that the inner sheet metal surfaces of the oven 12 be of a stainless sheet metal variety so that there will be a maximum heat reflection therefrom and so that they may be easily cleaned.

The rotary supporting mechanism for the meats to be cooked in the oven housing 12 is indicated generally by the reference character 31. A transverse shaft 32, located in the medial transverse plane of the oven housing 12, is journalled for rotation adjacent the opposite ends thereof in bushings 33 located in the side walls of the oven housing 12. One end of the shaft 32 projects through one side wall of the oven housing 12 into the chamber defined by the driving mechanism housing 13 and is provided with a pulley 34 keyed or otherwise suitably fixed to the end of the shaft 32 located in the housing 13.

A pair of rotary supporting members 35 and 36, are removably fixed on the shaft 32, as by set screws 32a, at positions adjacent the opposite side walls of the oven housing 12. The rotary supporting member 35 is shown provided with a pair of spaced apertures 35a adjacent the marginal portions thereof and in alignment with central apertures 37 located in the supporting member 36. If desired the supporting members 35 and 36 could each be formed in the shape of a cross to provide four radial arms (not shown) to thus eliminate the metal between the pairs of apertures.

One of the rotary supporting members, preferably the member 36, is also provided with a spring latch mechanism, indicated generally at 39 and illustrated in detail in Fig. 6. This spring latch mechanism comprises a supporting stud 40 projecting from the outer face of the supporting member or element 36 and being located toward the center of the member 36 along the medial radial axis thereof. The supporting stud 40 supports a leaf spring 41 radiating therefrom toward the outer edge of the element 36 along the medial radial axis thereof.

These rotary supporting members 35 and 36 are designed to interchangeably receive double tined spits for supporting steaks, chops, ribs, fowl, and the like. The preferred construction for the double tined spits, generally indicated by the reference character 42, is best illustrated in Figs. 6, 7 and 8 and comprises a pair of parallel prongs 42a and 43b terminating in pointed ends adapted to be received in the apertures 35a of the rotary supporting member 35, and a bridge portion 44 having a mounting shank 45 projecting from the midpoint of the bridge portion to extend through the central apertures 37 of the rotary supporting member 36. The mounting shank 45 is provided with an annular groove 46 which is disposed outwardly of the rotary supporting member 36 when the spit is in assembled relation with the rotary supporting members, the groove 46 being adapted to receive the leaf spring 41 to latch the spit in position on the rotary supporting members 35, 36. It will be noted that the shank 45 may be square to be received in square apertures 37 as indicated in Fig. 6 to prevent turning or may be round and provided with an abutment 44a as shown in Fig. 7 for this purpose. Another modified construction is shown in Fig. 8 in which pairs of apertures 37a are provided in lieu of central apertures 37 and are adapted to receive a pair of shank portions 45a.

The driving mechanism for the rotary assembly 31 is best illustrated in Figures 1 and 2 and comprises an electric motor 50 and reduction gear mechanism 51 supported on a platform 52, which in turn is pivotally supported at one end, as indicated at 53, to the base of the apparatus. The output shaft of the reduction gear mechanism 51 is provided with a pulley 56, which imparts a driving torque to the pulley 34 by means of a belt 57 extending around the pulleys 34 and 56. It will be noted that the pivoted arrangement of the platform 52 permits selection of the desired tension of the belt 57 on the pulleys 34 and 56.

It will be noted that an electrical heating element broadly designated at 60 is shown in the lower left-hand portion of Fig. 5 and is shown in detail in Fig. 3. A plate 61 is provided to cover the heating element 60 to protect same. The heating element 60 is preferably suitably positioned to one side of the rotary assembly 31 adjacent one of the oven walls so that drippings from the meat will not fall thereon. Flavoring means, preferably hickory wood 62 is placed on the plate 61 to emit smoke for flavoring the meat. Fig. 4 shows a modified form of the heating element 60 in which a vertically disposed, elongated, rod-like heating means 60a is provided positioned on a suitable support. A sheet metal container 65, in the form of a can, is provided for wood chips 62a and the like and an aperture 66 is provided to receive the element 60a to produce smoke which is emitted from apertures such as 67 which may be punched therein.

Fig. 2 shows a wiring diagram for operating the various devices of the machine. The lines 70 and 71 are connected across a suitable source of electrical energy. It will be noted that the motor 50, the heating element 60, the lights 72 and the main heating elements 30 are suitably connected across the lines 70 and 71. A thermostat 73 is provided in the line 71 so that the operation of the various devices will be discontinued when the temperature reaches a high enough point. Suitable switches 75, 76 and 77 are provided for the motor 50, the heating element 60, and the light 72, respectively.

In operation the spits 42 are removed from the rotary supporting members 35 and 36 by manually forcing the leaf springs 41 out of contact with the annular grooves 46 in the mounting shanks 45 and the spits 42 are shifted in the direction of the opposite rotary supporting member 35 until the end thereof clears the supporting member 36. When the meat has been impaled upon the prongs 43a and 43b of the spits 42, the spits may be reassembled in the rotary assembly 31 by reversing the above-described procedure. When the loaded spits are assembled on the rotary supporting members 35, 36, the motor 50 may be energized by switch 75 and the spits of the rotary assembly 31 will be rotated continuously during cooking at a preferred rate of approximately 8 R. P. M. A suitable temperature gauge may be provided to indicate the temperature within the oven housing 12 and the regulation of the temperature may be effected by adjustment of the thermostat 73.

By this particular arrangement, efficient self-basting of the meat by its own juices is achieved, thus materially reducing shrinkage. Further, the apparatus is readily adaptable to barbecuing of small food particles such as weiners, shrimp, and the like, as well as barbecuing of cuts of meat of conventional size. The design and construction of the apparatus is such that it will present a compact and neat appearance, that it may be easily kept clean, and that it is adaptable to either indoor or outdoor installations.

While a preferred embodiment of my invention has been described using specific terms, such description is for illustrative purposes only, and it is to be understood that changes and variations may be made without departing from the spirit or scope of the invention as defined by the appended claims.

I claim as my invention:

1. A barbecue machine comprising a substantially airtight, insulated oven, electrical heating means positioned adjacent the top and in the medial portion of the oven, a rotary meat supporting assembly positioned below and suitably spaced from said heating means for continuously transporting a plurality of pieces of meat in circular paths about a horizontal transverse axis within the oven with a selected portion of each piece continuously facing inwardly toward said axis, said assembly including a horizontal shaft rotatably supported adjacent each end thereof by the oven walls, rotary supporting members fixed on said shaft adjacent each of said walls, meat supporting spits for holding pieces of meat fixed in non-rotatable relation thereon, each of said spits including a pair of parallel prongs bridged at one end, each of said rotary supporting members having a plurality of spaced apertures adjacent the periphery thereof to receive the spits, means removably positioning the spits in assembled relation with the supporting members and automatically operable means for continuously rotating said shaft at a predetermined speed, whereby the meat may be slowly self-basted in its own natural juices and then easily and conveniently withdrawn from the oven.

2. A barbecue machine as set forth in claim 1, including a pair of parallel shanks projecting from said bridged end to be received by spaced apertures in one of the supporting members.

3. A barbecue machine as set forth in claim 1, in which said means removably positioning the spits includes spring latch means carried by one of said rotary supporting members operatively associated with said spits to resiliently retain said spits in assembled relation with said rotary supporting members.

4. A barbecue machine as set forth in claim 3, in which square apertures are provided in one of said rotary supporting members and in which the spits are provided with a square shank projecting from the medial portion of the bridged end to be received in one of said square apertures to prevent rotation thereof with respect to the supporting members.

5. A barbecue machine as set forth in claim 1, including an abutment carried by one of said rotary supporting members to engage said bridged end to prevent rotation relative to the spits and said supporting members.

6. A barbecue machine comprising a substantially airtight, insulated oven, electrical heating means positioned adjacent the top and in the medial portion of the oven, a rotary meat supporting assembly positioned below and suitably spaced from said heating means for continuously transporting a plurality of pieces of meat in circular paths about a horizontal transverse axis within the oven with a selected portion of each piece continuously facing inwardly toward said axis, said assembly including a horizontal shaft rotatably supported adjacent each end thereof by the oven walls, rotary supporting members fixed on said shaft adjacent each of said walls, meat supporting spits for holding pieces of meat fixed in non-rotatable relation thereon, each of said spits including a pair of parallel prongs bridged at one end each of said rotary supporting members having a plurality of spaced apertures adjacent the periphery thereof to receive the spits, means removably positioning the spits in assembled relation to the supporting members, an electrical heating element positioned within the oven, said heating element being adapted to produce smoke from wood chips and the like for flavoring the meat, means for collecting drippings from the meat at the bottom of the oven, hinged glass doors on the front and on the rear of said oven and automatically operable means for continuously rotating said shaft at a predetermined speed, whereby the meat may be slowly self-basted in its own natural juices and then easily and conveniently withdrawn from the oven.

References Cited in the file of this patent

UNITED STATES PATENTS

| 1,630,644 | Troiel | May 31, 1927 |
| 2,205,914 | Stafford | June 25, 1940 |
| 2,262,910 | Aller | Nov. 18, 1941 |
| 2,618,730 | Panken | Nov. 18, 1952 |

FOREIGN PATENTS

| 280,893 | Italy | Dec. 23, 1930 |